United States Patent [19]
Pena

[11] 3,710,500
[45] Jan. 16, 1973

[54] SELF-PROPELLED FISHING FLOAT WITH LINE RELEASE MECHANISM

[76] Inventor: Jose Baya Pena, Carretera de Sans, 277 Barcelona, Spain

[22] Filed: Aug. 5, 1971

[21] Appl. No.: 169,339

[30] Foreign Application Priority Data

Aug. 6, 1970   Spain..............................382.921

[52] U.S. Cl. ..................43/17.5, 43/26.1, 43/43.11
[51] Int. Cl. ..........................................A01k 93/00
[58] Field of Search..........43/26.1, 26.2, 17.5, 43.11, 43/19

[56] References Cited

UNITED STATES PATENTS

| | | | |
|---|---|---|---|
| 2,726,471 | 12/1955 | Uus | 43/26.1 |
| 2,888,771 | 6/1959 | Stephens et al. | 43/43.11 |
| 3,106,796 | 10/1963 | Friedland | 43/26.1 |

*Primary Examiner*—Warner H. Camp
*Attorney*—Harry W. F. Glemser et al.

[57] ABSTRACT

A self-propelled fishing float, with cylinders mounted therein that carry spring-biased pistons therein. A sinker, lead line and hook are received within each cylinder, with the piston depressed against its spring, the sinker being held in place by a lever mechanism connected to a timer. At a predetermined time after launch of the float the timer actuates the lever mechanism to release the sinkers, whereupon the spring-biased pistons discharge the sinkers with their attached hooks into the water.

7 Claims, 15 Drawing Figures

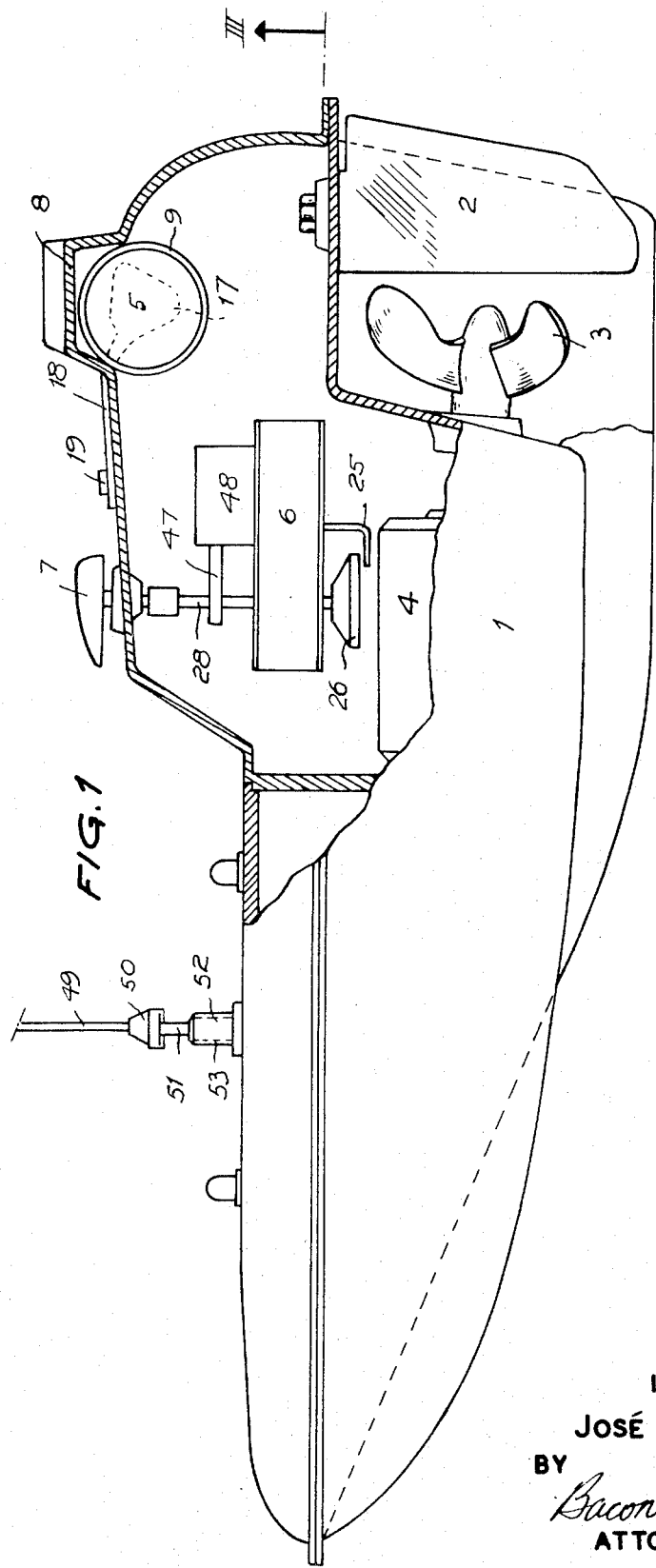

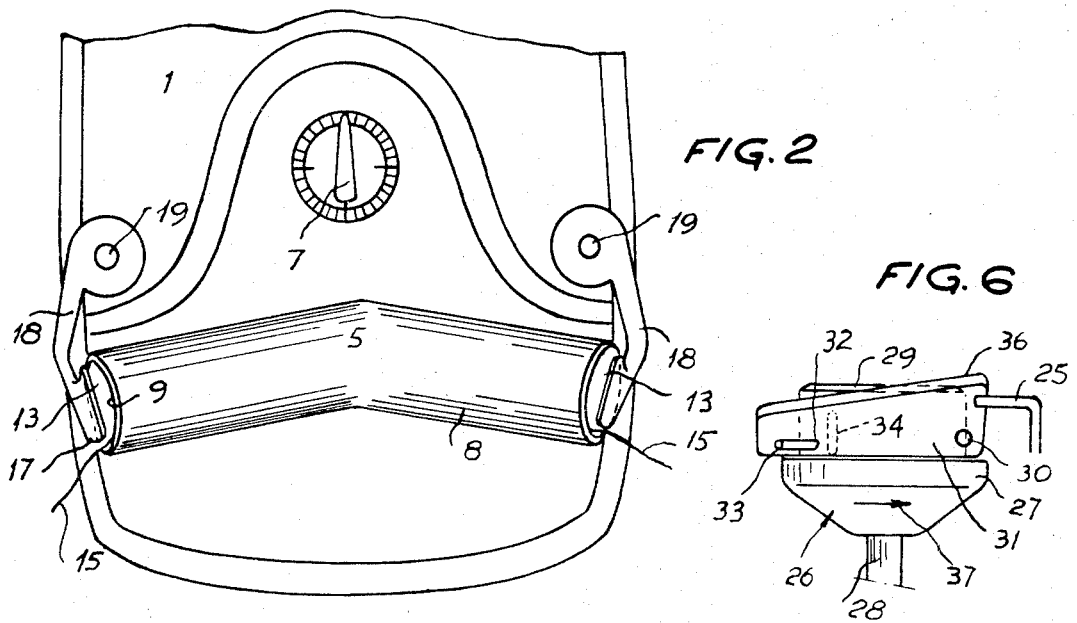
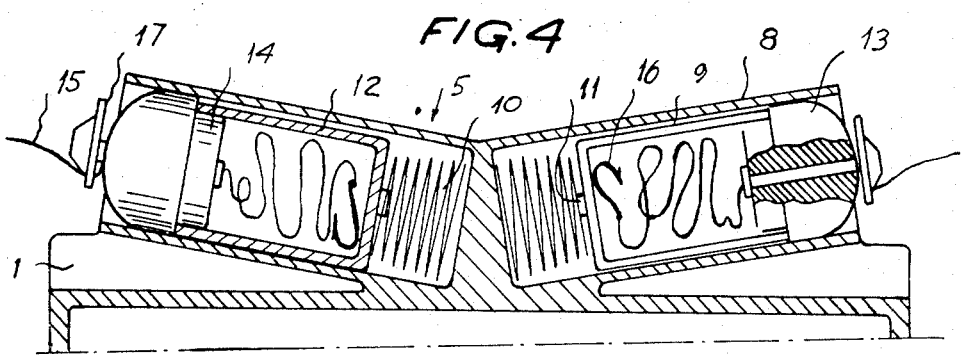
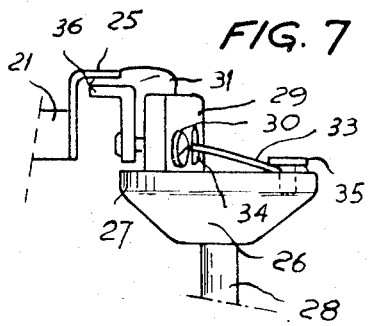

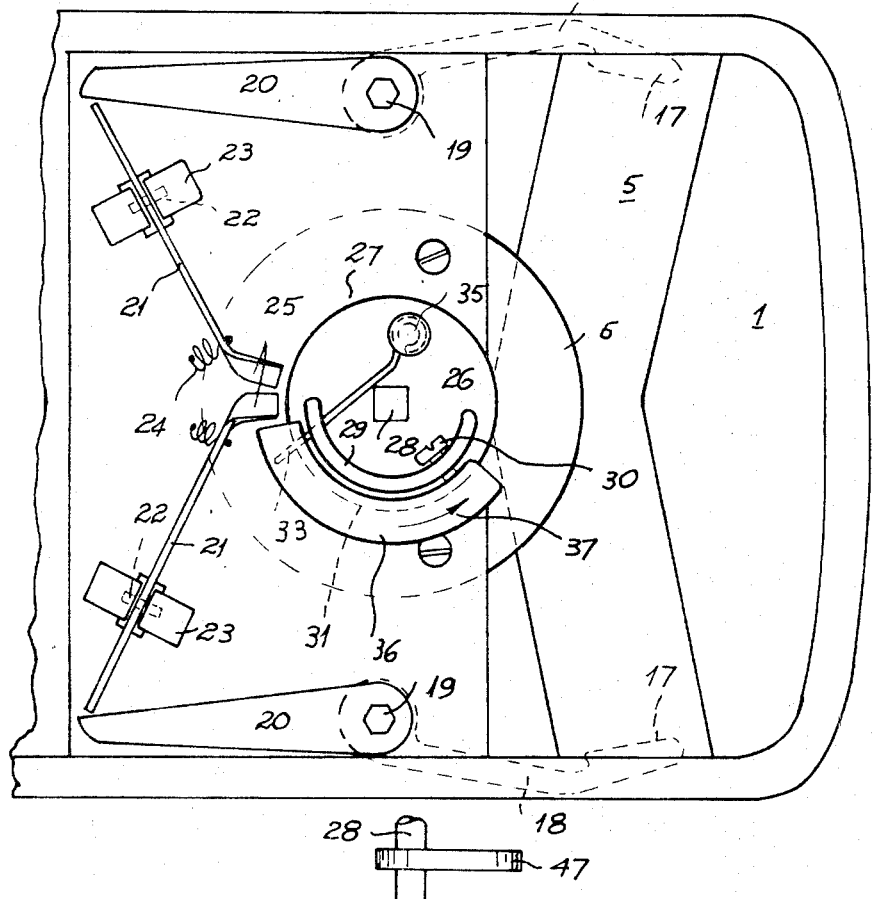
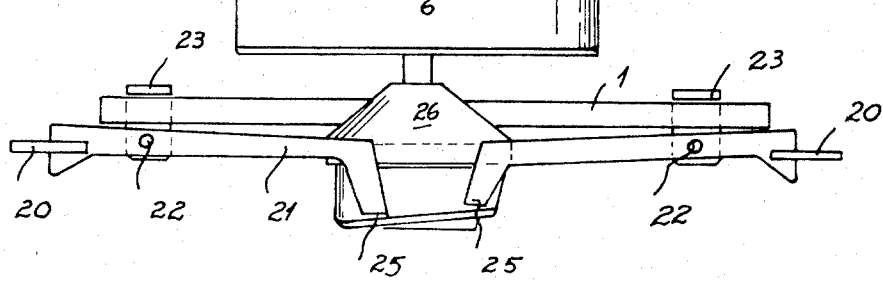

INVENTOR
JOSÉ BAYÁ PEÑA
BY
Bacon & Thomas
ATTORNEYS

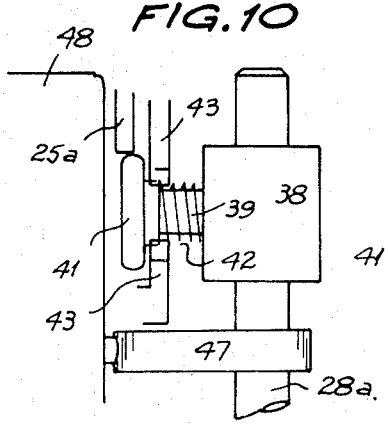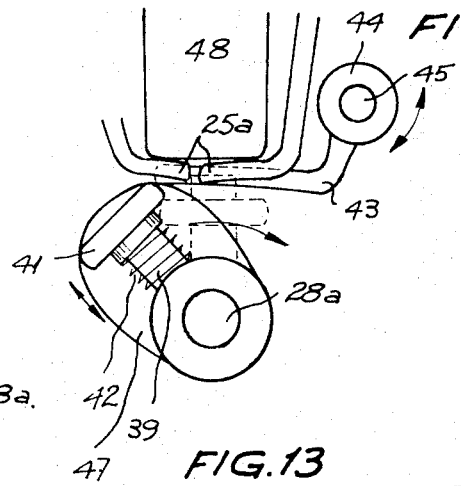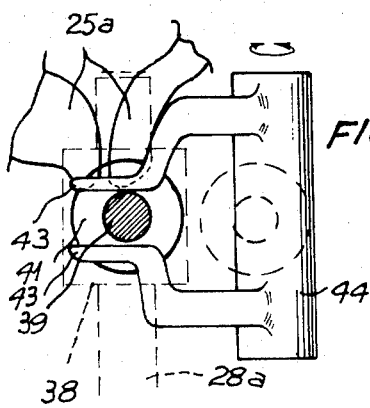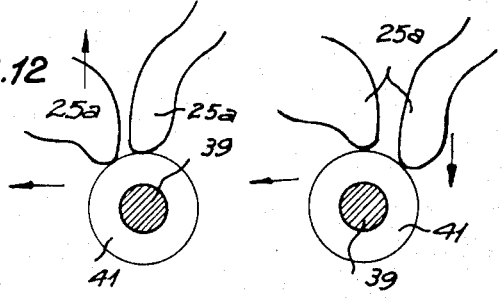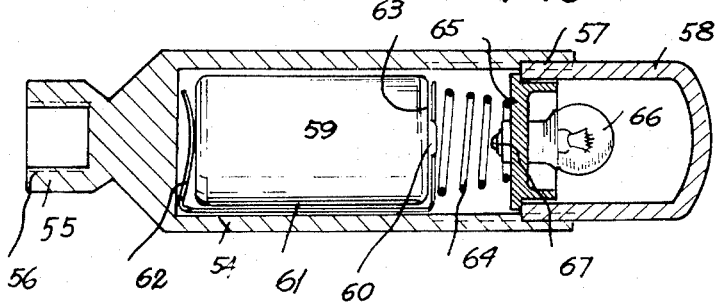

SELF-PROPELLED FISHING FLOAT WITH LINE RELEASE MECHANISM

BACKGROUND OF THE INVENTION

1. Field of the Invention

This invention relates generally to floats for fishing at long distances, and more particularly to an improved fishing float incorporating unique means to launch fishing lines at a predetermined time.

2. Description of the Prior Art

There has been conceived a device for fishing at long distances, comprising a self-propelled float attached to a recovery line, and provided with electromechanical devices which enable it to sink a fishing line and recover it in response to a fish's bite. In a previous improvement upon the basic device, means was provided so that the float could be attached to one or several fishing lines and tow them, by means of hooks operated by electromagnets which could be deactivated at the precise moment desired by a timer device, to thus allow the lines to sink by gravity, and the recovery of the float by means of the recovery line which remains attached to it.

In practice, certain difficulties have been observed in the operation of this system, especially concerning the releasing of the fishing lines from the float. The present invention is intended to solve those faults.

SUMMARY OF THE INVENTION

In the self-propelled fishing float of the present invention the fishing lines are stowed in casings which open out to the exterior of the float, the invention including mechanisms for releasing the lines and expelling them into the water, with their attached lead sinkers. The releasing mechanism is connected to a timer device, which allows the releasing and expelling operation to take place after a predetermined running time for the float.

In the preferred embodiment of the invention the casings include cylinders through which tumbler-shaped pistons run freely, the open ends of the tumbler-shaped pistons facing outwardly, and said pistons being pushed outwards by a spring connected thereto and which rests on the bottom part of the cylinders. The hook and leader of a fishing line are placed in one of the pistons, and the sinker attached to the line is pressed into the cylinder to depress the piston. The sinker thus forms a cap for the cylinder, and is retained in place by a fastening device during the towing period for the fishing float, the fastening device being connected to a timer carried by the float.

The fastening devices include a cover for each cylinder opening, arranged on a pivoted lever to be moveable for covering the opening to thus retain the sinker in place against the depressed piston spring. The levers are mounted on drive shafts that extend into the float, and which are arranged to cooperate with a releasable catch mechanism connected with the timer. When the timer actuates the releasable catch mechanism the lever arms pivot to move the covers away from the cylinder openings, thus allowing the sinker, the leader and the hook to be expelled into the water by the spring-biased pistons.

The fishing float of the present invention is also provided with a luminous position indicator, including a tumbler-shaped body which is coupled by its bottom part to a complementary coupling device on the top part of the hull of the float. The body contains a dry cell, and has its top opening covered by a transparent dome that is screwed into place, and which contains a socket for a bulb. The bulb has its central contact resting against the positive terminal of the cell when the dome is screwed home into place, and the cap of the lamp socket is in contact with a coil spring that rests on a contact ring at one end, and at the other end on the insulated surface of the top of the cell, from where a contact plate extends to the other end of the cell to connect with the negative terminal.

BRIEF DESCRIPTION OF THE DRAWINGS

FIG. 1 is a side view, partially broken away, of a self-propelled fishing float, including a first embodiment of the present invention;

FIG. 2 is a partial top view of the fishing float of FIG. 1;

FIG. 3 is a sectional view taken along level III of FIG. 1, looking upwardly;

FIG. 4 is a sectional view through the axes of the cylinders and pistons for holding and launching the fishing line;

FIG. 5 is a view in elevation of the fastening and releasing mechanism of the invention, in association with the timer device;

FIG. 6 is a vertical elevation of the cam structure for releasing the holding mechanism, shown in association with one of the cam followers;

FIG. 7 is a view similar to FIG. 6, showing the cam structure from the opposite side;

FIG. 10 is a side elevational view of the fastening mechanism of FIG. 9, shown in its releasing position with the cam acting on the cam followers;

FIG. 11 is a partial top view of the fastening device of FIG. 9, with the retracted position of the cam wheel during winding of the timer device being shown in dotted lines;

FIG. 12 is a partial view showing a front view of the fastening device with the cam roller in its releasing position;

FIGS. 13 and 14 show the different stages of the fastening device during the releasing and expelling of the lines and sinkers from their cylinders, for the embodiment of FIG. 8; and FIG. 15 is an axial sectional view of the luminous position indicator of the invention, adapted to be installed on the float of FIG. 1 in place of the antenna structure.

DESCRIPTION OF THE PREFERRED EMBODIMENTS

Figure 8:
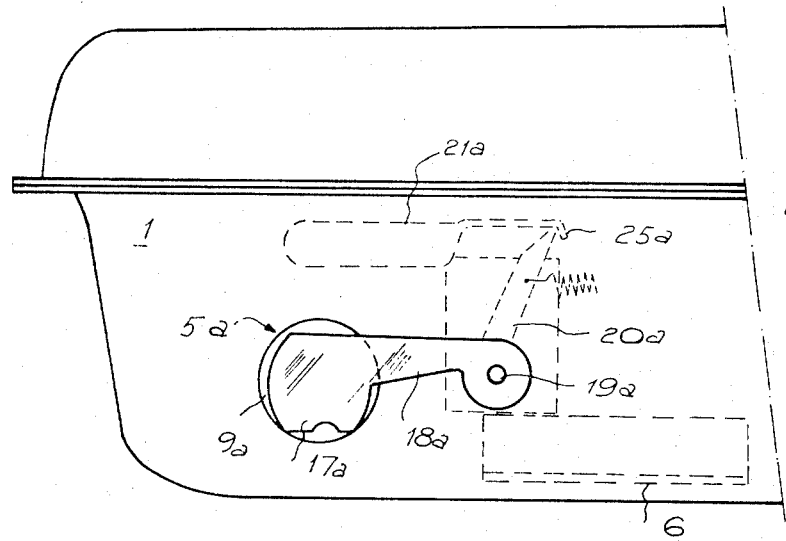
FIG. 8 is a partial view in elevation of a fishing float equipped with another embodiment of the present invention, wherein the cylinders are positioned below the waterline.

Referring now to FIG. 1, the hull of the self-propelled fishing float of the invention is indicated at 1, and carries an adjustable rudder 2, a propeller screw 3 driven by an electric or other type of motor 4, and fastening and releasing mechanisms indicated generally at 5 which are activated by a timer 6 that is controlled by a switch 7 on top of the hull.

The lead sinker releasing devices include a hump 8 on top of the hull 1 in which there are two cylindrical casings 9 that lead out to the exterior, each casing containing a coil spring 10 that is attached at 11 to the bottom part of a tumbler-shaped piston 12 that slides freely within its associated casing. The mouths or open ends of the pistons 12 receive lead sinkers 13 that include tapered portions 14 which fit snugly within the casing. The sinkers 13 are each attached in the conventional manner to a fishing line 15 equipped with a hook 16, the hook 16 and its leader being stowed within the associated tumbler-shaped piston, as shown in FIG. 4.

The sinkers 13 are kept in position for towing by each of two plates 17 (FIG. 2), each carried on the end of a lever 18 joined at its other end to a shaft 19 that enters the hull 1 through a conventional sealing or retention device (not shown in the drawings), and which shaft connects inside the hull with a fastening lever 20. The free ends of the levers 20 lock in with the projecting outer ends of two triggers 21 which swing freely on shafts 22 fixed to supports 23 that are part of the hull 1, which triggers are pulled towards the fastening position by springs 24. The opposite, inner ends of the triggers 21 form cam followers 25 set in such a manner that they are driven by a cam device, generally indicated at 26, and which is controlled by the time-lag or timer device 6.

The cam device 26 includes a plate 27 mounted on the camshaft 28 of timer 6, and provided with a partition 29 that protrudes, in an arch-like manner, from the front of said plate 27 for about one-third of the circumference thereof. Near one of its ends the partition 29 has a fixed shaft 30 that projects radially outwardly, and on which a piece 31, very similar to the partition 29, oscillates freely. The opposite end of the piece 31 has a hole 32 in which one of the ends of a wire spring 33 is anchored, from where said spring goes through a vertical slot 34 in partition 29, the opposite end of the spring 33 being fastened to the plate 27 by a screw 35, in such a way that it pulls the piece 31 toward the plate 27, keeping it in the towing position as shown in FIG. 6. The free trailing end of piece 31 is bent out radiusly to form a helicoid cam profile 36 that is set, in reference to the cam followers 25, as shown in FIG. 6.

According to FIGS. 3, 6 and 7, when arming or setting the device of the invention the plate 27 is rotated in the direction of the arrow 37 (FIGS. 3 and 6), in such a way that the cam 36 passes over the followers 25, its low end being lifted by them and then being moved back into place by the spring 33 when the position shown in FIG. 3 is reached. In the working of the timer device 6 thereafter, the plate 27 rotates in the opposite direction from the arrow 37, and the low end of the cam 36 goes under the followers 25. The rotating cam 36 then lifts the triggers 21 with its slope, thus freeing the fastening levers 20. Consequently, the levers 20 are moved by the action of the springs 10, and the sinkers 13 with their attached hooks 16 are released and expelled from the casings 8.

Continuing their motion until the end of the timer's run, the followers 25 fall from the top or peak end of the helicoid cam 36, the spring 24 then causing the followers 25 and their triggers 21 to be returned to their initial or rest positions.

In FIGS. 8–14 another version of the fastening device is shown. Elements are indicated in these Figures with the same reference numbers as in FIGS. 1–7, followed by an *a*, where they are equivalent to those in said previously described embodiment.

In this embodiment the cam device includes a block 38 mounted on the timer crankshaft 28a and from which a fixed pin 39 protrudes, the pin 39 ending in a head 40. On the pin 39 there is slidably and rotatably received a free cam roller 41, which is forced against the head 40 by means of a coil spring 42 that surrounds the pin 39. These pieces are set in such a way that the cam roller 41 can pass under the followers 25a, lifting them and releasing the lead sinkers and lines in a manner like that previously described. Under these fasteners are two fork-shaped brackets 43, solidly joined to a vertical sleeve 44 that rotates freely on a fixed axle 45, and which is pulled against the followers by a spring (not shown in the drawings, for simplicity's sake).

Figure 9:
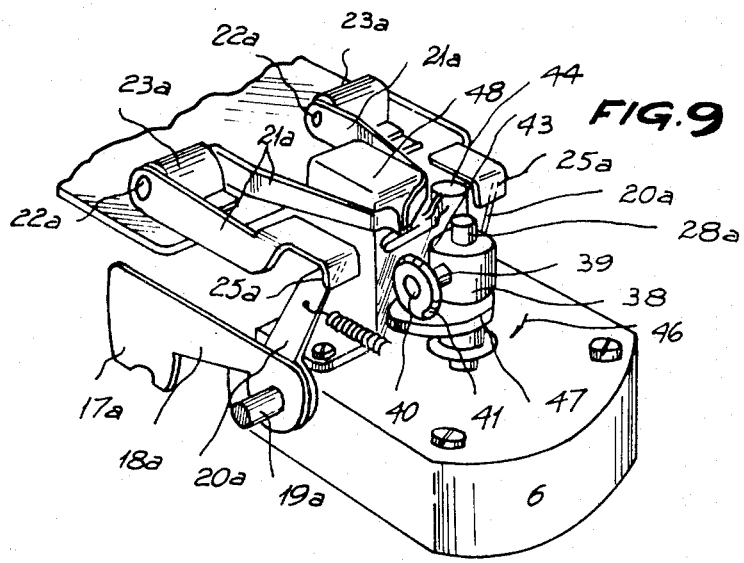
FIG. 9 is a perspective view of the releasing mechanism of the embodiment of FIG. 8, in its rest or towing position.

In FIG. 9, this device is shown in the rest or towing position. When setting the timer device 6, the described parts rotate in the direction of arrow 46. The brackets 43 of the fork have a length which enables them to stop the roller 41 with their tips, forcing it to slide inwardly on the pin against the force of the spring 42 to pass in front of them (as indicated by dotted lines in FIG. 11). When reaching the armed position, the roller 41 is in the position indicated by dotted lines in FIG. 12, that is, between the brackets 43 of the fork, which are curved in such a manner that the space between them increases to bigger than the diameter of the roller.

Once past the brackets 43, the spring 42 forces the roller 41 outwardly again, against the head 40. When then moved in the opposite direction by the timer 6, the roller 41 passes behind the curved brackets 43 (as shown in FIG. 10), and drives the followers 25a, as shown in FIGS. 13 and 14. When the pieces go beyond the tips of the brackets, all moving parts return to the rest position.

In both of the described embodiments, a cam 47 carried on the shaft 28 or 28a of the timer 6 works a microswitch 48 that is connected to stop the motor 4 of the fishing float after a set time of running.

As is obvious, the effect of the mechanism of the second embodiment is exactly the same as for the embodiment described previously. In the latter version, the casings for the lead sinkers and lines are under the waterline, as opposed to above the waterline in FIG. 1, which however does not alter the main idea of the invention.

Referring again to FIG. 1, a position indicator is shown on the fishing float therein, and includes an antenna 49 provided with a terminal end 50 having a threaded core 51 that screws into threads 53 within a stump 52 protruding from the top of the hull 1. When the antenna 49 is not in use, the stump 52 is sealed by a watertight cap that screws into the interior thread 53 of the same.

Instead of the antenna indicator device just described, an indicator device like that shown in FIG. 15 can be used. It includes a hollow cylindrical main body 54 open on its front end and from the bottom of which a stump 55 protrudes that is provided with an interior thread 56 complementary to the stump thread 53 on the hull 1, and which can be connected to the stump 52 by a threaded nipple. The open front end of the body 54 has an interior thread 57, within which a transparent dome 58 is screwed in a water-tight manner. Inside the cylindrical body 54 a dry cell 59 is received, with its positive terminal 60 pointing upwards. On the cell's side there is a metal strap 61 bent on both ends, and which forms a bracket that contacts the negative terminal 62 of the cell 59 on the bottom end, and which rests on the insulated top edge of the cell by means of a contact ring 63 formed on the strap.

The bottom end of a conical spring 64 rests on the contact ring 63, the top end of the spring being in contact with a metal plate 65 which can move freely inside the body 54 together with the dome 58, and which forms a socket for a lamp bulb 66. The central contact 67 of the lamp bulb 66 rests against the positive terminal 60 of the cell 59 when the dome 58 is fully screwed home, whereby the spring 64 is compressed.

The way in which the indicator light operates can be easily deduced from the drawings and the description. When the dome 58 is partially screwed out of the body 54, as shown in FIG. 15, the bulb is held out of contact with the battery or cell 59, and draws no current. Before launch of the fishing float, the dome 58 is screwed home, to energize and light the bulb 66.

The present invention offers several improvements and advantages over present fishing floats. In the first place, the forced releasing or expelling of the sinkers, with their attached lines and hooks, is a positive action that makes fishing operations with the float secure. The releasing mechanism acts positively under control of a timer, to assure release at the desired time. Also, the battery-operated signal device requires no larger energy source such as is needed with a radio beacon, and is compatible with various types of motors used for power.

Obviously, many modifications and variations of the present invention are possible.

I claim:

1. In a fishing float: a hull; at least one outwardly opening casing means carried by said hull, said casing means being adapted to receive a sinker and hook attached to a fishing line; means within said casing means operable when released to propel said sinker and hook outwardly into a body of water on which said hull is floating; fastening means for releasably retaining said sinker and hook within said casing means, against the force of said propelling means; a timer device carried by said hull; and releasing means engageable with said fastening means, and operable by said timer to release said fastening means at a predetermined time, whereupon said sinker and hook are expelled from said casing means into said body of water.

2. In a fishing float as recited in claim 1, wherein said casing means includes a cylindrical casing having a bottom wall, and arranged in said hull to open outwardly, and wherein said propelling means includes: a piston slidably received within said cylindrical casing; and a spring disposed between said piston and said bottom wall of said casing, said spring being compressed by insertion of said hook and sinker into said cylindrical casing.

3. In a fishing float as recited in claim 2, wherein said piston is tumbler shaped and opens outwardly, whereby said hook is receivable therein.

4. In a fishing float as recited in claim 2, wherein said fastening means includes: a first lever, disposed outside said hull, one end of said first lever being positioned over the open end of said cylindrical casing, and the other end thereof being secured to a drive shaft mounted to extend into said hull, whereby said first lever can pivot between a first position wherein said one end thereof is adjacent said open end of said casing to hold said sinker and hook therein, and a second release position spaced from said open end; and a second lever mounted on said drive shaft within said hull, and engageable with said releasing means when said first lever is in said first position thereof.

5. In a fishing float as recited in claim 4, wherein said releasing means includes: a trigger lever pivotally mounted centrally thereof to bracket means within said hull, one end of said trigger lever being engageable with said second lever of said fastening means, and the other end of said trigger lever having cam follower means thereon; resilient means arranged to urge said one end of said trigger lever toward engagement with said second lever of said fastening means; and cam means carried by said timer device, and arranged to engage said cam follower means on said trigger lever during operation of said timer, whereby said trigger lever is pivoted by interaction of said cam means and said cam follower means to disengage from and release said second lever of said fastening means.

6. In a fishing float as recited in claim 1, including additionally: luminous indicator means carried by said hull.

7. In a fishing float as recited in claim 6, wherein said luminous indicator means includes: a hollow, cylindrical main body secureable at one end to said hull, and open at its other end, the open end of said main body being internally threaded; a dry cell received within said hollow main body; a transparent dome threadably received within said hollow main body, and carrying a socket equipped with a lamp; a metal strap within said main body, one end of said strap being engaged with the negative end of said cell, and the other end thereof having a contact ring thereon that rests on the insulated top end of said cell about the positive terminal thereof; and a spring arranged between said contact ring and said lamp socket.

* * * * *